United States Patent [19]

Imbery, Jr.

[11] Patent Number: 5,007,545
[45] Date of Patent: Apr. 16, 1991

[54] REMOVAL RESISTANT MEMBER

[75] Inventor: Leo R. Imbery, Jr., Crystal Lake, Ill.

[73] Assignee: Seaquist Closures, Crystal Lake, Ill.

[21] Appl. No.: 494,238

[22] Filed: Mar. 15, 1990

[51] Int. Cl.[5] .............................................. B65D 47/02
[52] U.S. Cl. ..................................... 215/14; 215/1 R; 215/252; 215/258; 222/147
[58] Field of Search ............... 215/252, 253, 258, 263, 215/1 R, 14; 222/147

[56] References Cited

U.S. PATENT DOCUMENTS

| | | |
|---|---|---|
| 3,329,295 | 7/1967 | Fields . |
| 3,441,161 | 4/1969 | Van Baarn . |
| 3,929,246 | 12/1975 | Leitz . |
| 4,156,490 | 5/1979 | Peraboni . |
| 4,196,818 | 4/1980 | Brownbill . |
| 4,299,328 | 11/1981 | Ochs et al. . |
| 4,322,009 | 3/1982 | Mumford . |
| 4,322,011 | 3/1982 | Mumford . |
| 4,333,577 | 6/1982 | Mumford . |
| 4,407,422 | 10/1983 | Wilde et al. . |
| 4,417,666 | 11/1983 | Roberts . |
| 4,418,828 | 12/1983 | Wilde et al. . |
| 4,458,821 | 7/1984 | Ostrowsky ........................... 215/252 |
| 4,470,513 | 9/1984 | Ostrowsky ........................... 215/252 |
| 4,478,343 | 10/1984 | Ostrowsky ........................... 215/252 |
| 4,506,795 | 3/1985 | Herr . |
| 4,511,054 | 4/1985 | Shank . |
| 4,545,496 | 10/1985 | Wilde et al. . |
| 4,550,844 | 11/1985 | Lininger ............................... 215/252 |
| 4,595,110 | 6/1986 | Herr .................................... 215/252 |
| 4,732,289 | 3/1988 | Granat et al. ........................ 215/252 |
| 4,759,456 | 7/1988 | Kusz . |
| 4,801,030 | 1/1989 | Barriac ................................ 215/252 |
| 4,875,594 | 10/1989 | Ochs .................................... 215/252 |
| 4,913,300 | 4/1990 | Wiedmer et al. ................... 215/252 |
| 4,938,370 | 7/1990 | McBride ............................. 215/252 |

FOREIGN PATENT DOCUMENTS 2033350  5/1980  United Kingdom .
2034674  6/1980  United Kingdom .

Primary Examiner—Stephen Marcus
Assistant Examiner—Stephen K. Cronin
Attorney, Agent, or Firm—Dressler, Goldsmith, Shore, Sutker & Milnamow, Ltd.

[57] ABSTRACT

A member is provided for being mounted on the neck of a container. The member has a skirt with at least a first annular section extending axially below an annular bead on the container. A plurality of circumferentially spaced arms are flexibly connected to, and extend from, the skirt first annular section at a first bend line to accommodate radially inward pivoting of each arm to an orientation generally alongside the skirt first annular section. A plurality of circumferentially spaced tabs are each flexibly connected to, and extend radially inwardly of, one of the arms at a second bend line to accommodate radially inward pivoting of each tab toward the container when sufficient relative axial displacement is effected between the closure and the container. A novel method is provided for arranging unique mold parts for molding the mounting member and for moving the mold parts to release the molded mounting member in an assembly-ready orientation for application to the container.

1 Claim, 4 Drawing Sheets

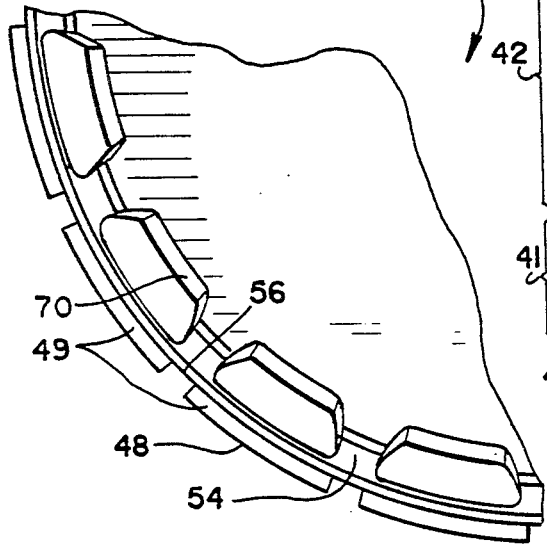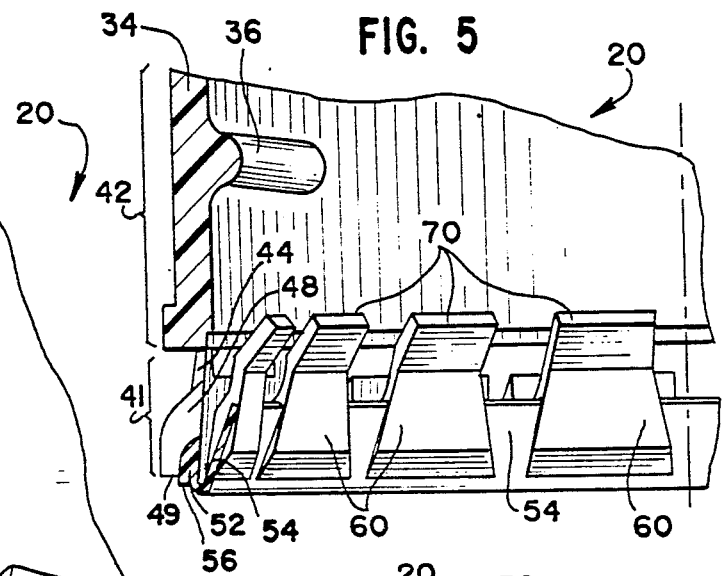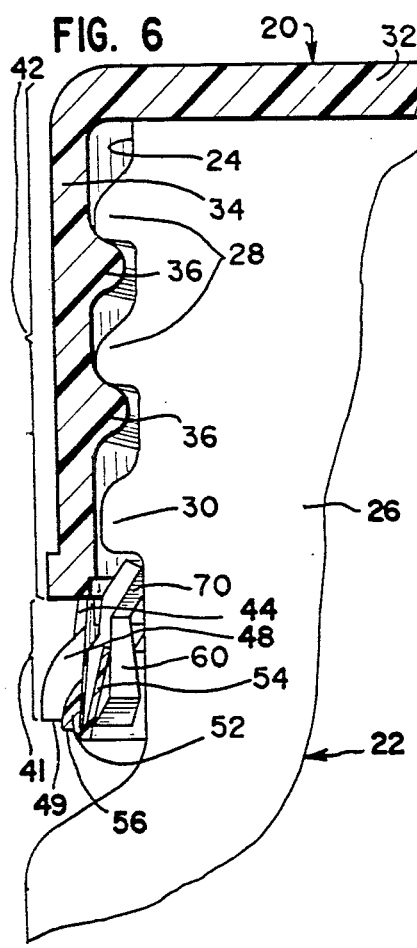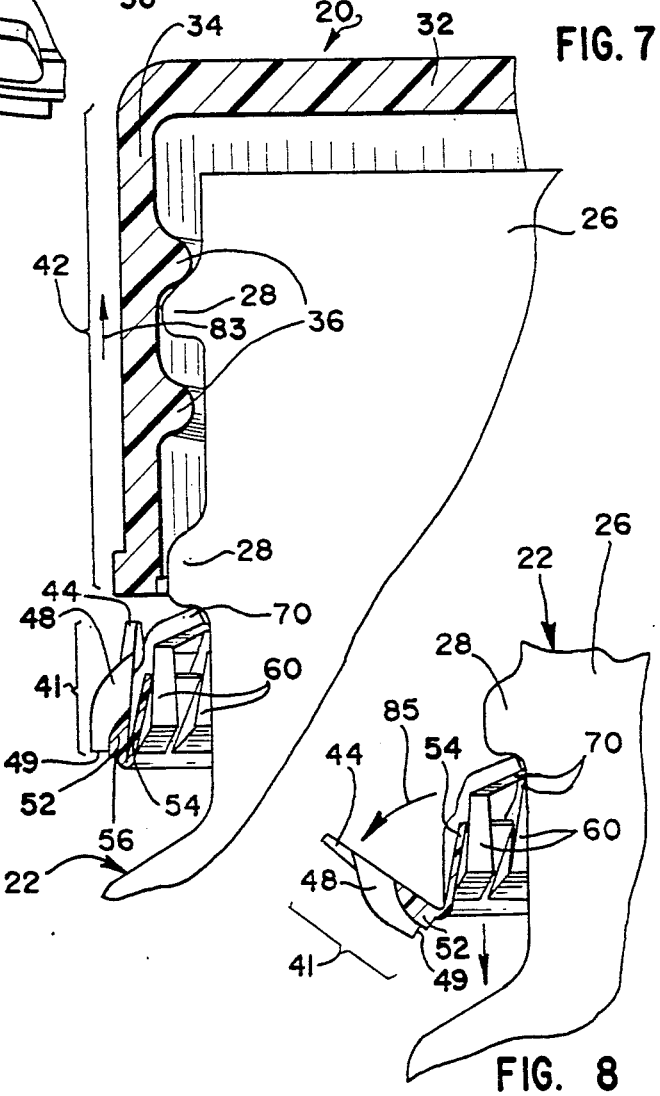

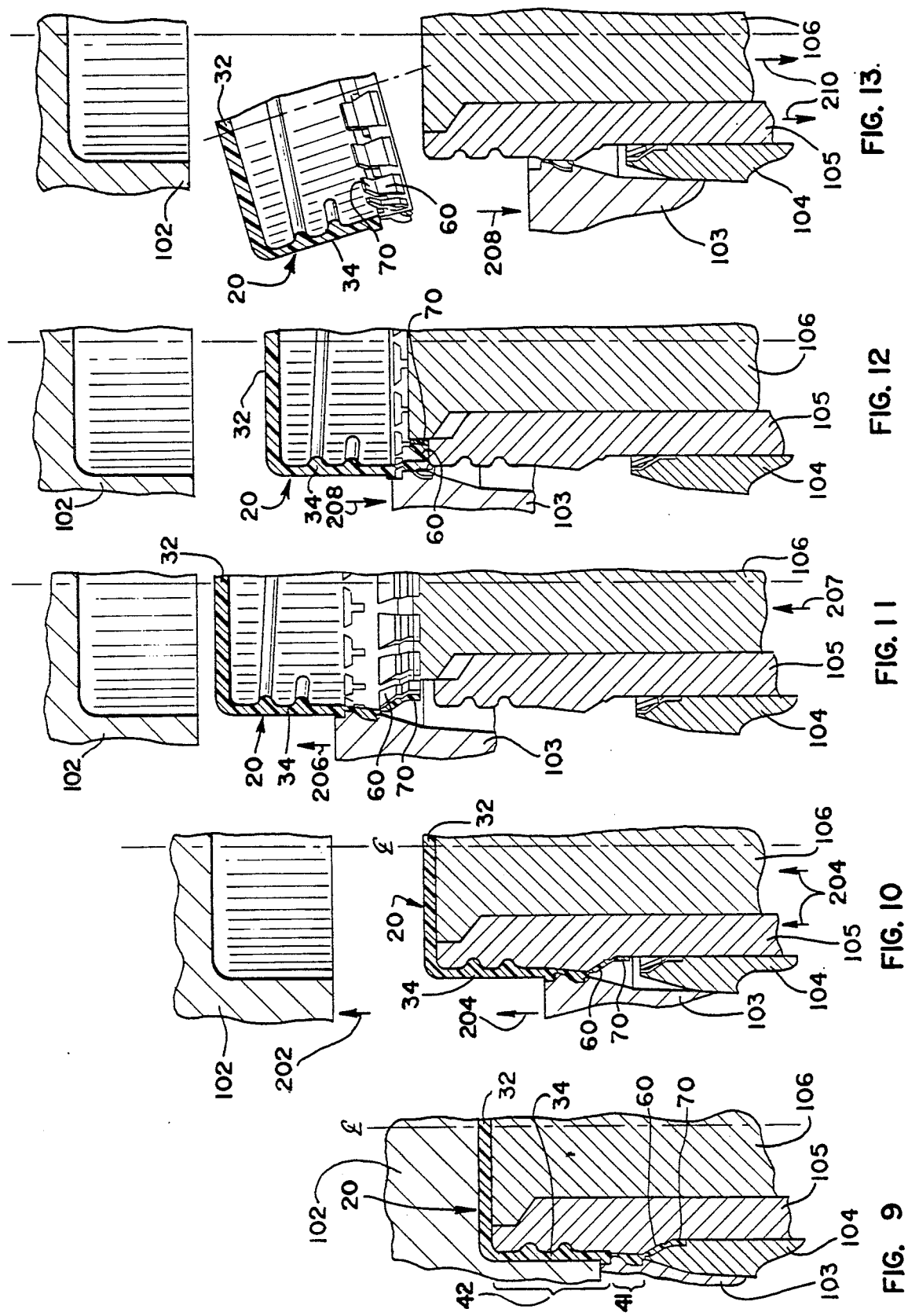

REMOVAL RESISTANT MEMBER

TECHNICAL FIELD

This invention relates to a member or component, such as a closure, sleeve, or other structure, which can be mounted to a container and which resists removal from the container. The member is particularly well-suited for use as a closure for threadingly engaging the container and incorporating a tamper-evident feature.

BACKGROUND OF THE INVENTION AND TECHNICAL PROBLEMS POSED BY THE PRIOR ART

Closures of various types have been proposed in the prior art for use with containers to resist removal of the closure. Some types provide a visual indication that the container has been subjected to a previous opening attempt. This alerts a consumer to the possibility of a previous attempt to tamper with the container or contents. Various arrangements of such closure structures are sometimes referred to as pilfer bands, tamper bands, guarantee bands, security rings, tamper-indicating closures, tamper-evident closures, etc.

In many applications, at least the closure is fabricated from a synthetic, plastic material, and the container is also typically fabricated from a synthetic plastic material. With some prior art tamper-evident closures, a tamper-evident band of the same material must be torn from the closure or container. This results in a piece of waste material which must be discarded and which is frequently dropped as litter. It would be desirable to provide an improved closure in which a tamper-evident band remains mounted on the container so that it does not contribute to a littering problem and so that it clearly indicates that the container has been opened.

Some tamper-evident closures include engaging structures which are visible and, to some extent, accessible when the container is closed. Such structures may be susceptible to manipulation and/or deforming operations which may permit removal and replacement of the closure without providing the intended visual indication. It would be preferable to provide an improved tamper-evident closure which could not be so easily defeated.

It would also be advantageous to provide such an improved closure with a structure that would accommodate assembly onto the container by automatic closure-applying apparatus as well as manually.

In addition, it would be beneficial if a removal-resistant structure could be incorporated in a closure (or other member) mounted on a container in a way that would not create excessively large stresses or cause an increase in the diameter of the closure. Further, it would be advantageous if such an improved structure projected radially inwardly and outwardly only a relatively small amount so as to provide a relatively thin circumferential structure around the container.

In addition, it would be desirable if such an improved removal-resistant structure could be provided with a configuration for accommodating assembly onto the container without requiring excessive application forces. However, it would also be beneficial if such an improved structure could be configured to provide increasing engagement forces and increasing resistance to removal in response to increasing removal forces.

An improved removal-resistant closure or member should preferably also have a structure that would accommodate high speed, low-cost manufacture, such as by molding from plastic material. To this end, a salutary feature of an improved structure would be a configuration that could be molded without the use of a side action mold. Preferably, such an improved structure should also have the capability for being molded and released from the mold without being subjected to high distortion forces that are sometimes associated with some conventional mold product release operations.

Also, it would be desirable to provide a removal-resistant member that could be relatively easily mounted on a container for attaching to the container a variety of objects (e.g., a closure integral with the member, an auxiliary closure, a tag, or other device which is intended to be used with, on, or about the container).

Finally, it would be desirable to provide an improved removal-resistant structure and method for fabricating the structure wherein the structure can be molded from plastic material and does not require secondary operations (such as subsequent forming, heating, or shaping) in order to complete the fabrication.

SUMMARY OF THE INVENTION

In accordance with the present invention, a member is provided for being mounted to a container. In a preferred embodiment, the member is in the form of a closure for being rotatably mounted to a container that has an exterior surface portion with an annular bead projecting from the circumference of the exterior surface portion.

The member has a skirt for being disposed around the container exterior surface portion with at least a first annular section of the skirt extending axially on one side of the container annular bead. In one preferred embodiment, the first annular section includes a thick, peripheral band portion connected through frangible bridges to an upper, second annular section of the skirt. This band portion may be reinforced with a plurality of circumferentially spaced thicker segments.

The closure includes an extension means for extending from the peripheral edge of the skirt first annular section between first and second bend regions. In one preferred embodiment, the extension means includes a thin, peripheral band portion unitary with a plurality of circumferentially spaced arms which also extend from the skirt first annular section. A first flexible connecting means is provided for connecting the thin band portion and each arm to the skirt first annular section at the first bend region. This accommodates radially inward pivoting of the thin band and each arm to an orientation generally alongside the skirt first annular section.

The closure includes an engaging means for engaging the annular bead on the container. The engaging means is flexibly connected to the extension means at a second bend region to accommodate inward movement toward the container. In the preferred embodiment, the engaging means includes a plurality of circumferentially spaced tabs which each extend from, and radially inwardly of, the extension means (which, in a preferred embodiment, includes the arms). Second flexible connecting means are provided for connecting each tab to the extension means (e.g., one of the arms) at the second bend region. This accommodates radially inward pivoting of each tab toward the container when sufficient axial displacement is effected between the mounting member and the container to engage the container annular bead with the distal end of the tab and thereby resist further axial displacement.

The novel mounting member of the present invention can be readily assembled onto a container by automatic closure-applying apparatus as well as manually. Owing to the unique, flexibly connected extension means and tab structure, the mounting member can be assembled onto the container in a way that does not create excessively large stresses or cause a permanent deformation or diameter increase of the member. When in position on a container, the structure projects radially inwardly only a relatively small amount. However, when an attempt is made to remove the member, the tabs engage even more securely with the container to provide increasing resistance to removal with increasing removal forces.

The mounting member of the present invention can be readily molded from plastic material according to a novel process which does not require side action molds. It can be molded and released from the mold without being subjected to high distortion forces that are sometimes associated with mold product release operations.

The mold parts are initially positioned along a longitudinal axis in a closed position and the mounting member is molded therein with the member extension means (e.g., arms) and engaging means (e.g., tabs) located axially on one side of the first bend region.

The mold parts include an exterior mold means for defining the exterior surfaces of the skirt annular section, extension means, and engaging means. The mold parts also include a core mold means for defining the interior surfaces of the annular section, extension means, and engaging means. A repositioning mold means is provided for repositioning the molded engaging means and the connected extension means axially on the other side of the first bend region after molding during the mold release operation.

After molding the member, relative movement is effected between at least the molded member and the core mold means to expose the interior surfaces of the annular section, extension means, and engaging means.

Next, relative axial movement is effected between the repositioning mold means and the molded mounting member to engage at least the engaging means with the repositioning mold means to reposition the engaging means and connected extension means axially on the other side of the first bend region. The mounting member is then in an orientation to be completely released from the mold parts to permit it to assume the assembly-ready orientation for application to the container.

In a preferred embodiment of the method, the exterior mold means includes (1) a cavity mold having a cavity defining the exterior surface of a skirt of the mounting member, (2) an ejector sleeve adjacent the cavity mold for defining an exterior of a first annular section of the skirt below the cavity mold, and (3) a stationary sleeve defining the exterior surface of (a) an extension means (e.g., thin band and arms) extending from the first annular section and (b) an engaging means (e.g., tabs) extending from the extension means.

The core mold means includes, in the preferred form of the method, a generally annular core defining internal surfaces of the mounting member skirt, extension means, and engaging means.

In the preferred form of the method, the repositioning mold means includes the annular distal end surface of the annular core and a cooperating core ejector disposed within said core for extending from said core to define an annular shoulder for contacting the mounting member engaging means and extension means.

After the mounting member has been molded, the cavity mold is moved axially in a first direction away from the molded mounting member to an open position spaced from the mounting member. At the same time, or afterwards, the ejector sleeve is moved axially in a first direction relative to the core to strip the molded mounting member past the core. The core ejector is moved axially with the ejector sleeve or afterwards so as to define an annular shoulder around the core ejector at the end of the core.

Preferably, the ejector sleeve, core, and core ejector are initially moved together axially in the first direction to carry the mounting member axially toward the open cavity mold so that the extension means (e.g., arms) and engaging means (e.g., tabs) are axially displaced from the stationary sleeve, and then the ejector sleeve and the core ejector are further moved axially in the first direction relative to the core so as to strip mounting member past the core.

The ejector sleeve is then returned back toward the initial mold closed position by moving the ejector sleeve axially in a second direction opposite to the first direction to carry with it the molded mounting member. The distal ends of the engaging means (e.g., tabs) engage the core and core ejector in the shoulder region. This causes the engaging means (e.g., tabs) to deflect toward, and become oriented adjacent, the extension means while the extension means (e.g., arms) move toward the first direction into an inverted orientation restrained by the core as the ejector sleeve separates from the mounting member.

Finally, the core ejector is returned to the initial mold closed position by moving the core ejector axially in the second direction opposite the first direction. This disengages the core ejector from the engaging means (e.g., tabs) and leaves the extension means (e.g., arms) inverted with the mounting member free of the mold parts so as to permit the engaging means (e.g., tabs) to pivot alongside the skirt to an operable orientation for accommodating subsequent application of the mounting member to the container.

In a preferred form of the invention, the mounting member is provided as a closure with a tamper-evident feature. Specifically, the skirt includes a second annular section located axially adjacent, and extending from, the first annular section. Frangible means are provided for connecting the first and second annular sections of the skirt. The skirt also includes internal threads for engaging external threads on the container. As the closure is rotated on the container in a direction to remove the closure from the container, the frangible means break. This results in a separation of the first and second annular sections of the skirt. The first annular section remains on the container neck, and the arms flair radially outwardly. Thus, there is then a visual indication that the closure has been removed, or at least partially removed, from the container.

Numerous other advantages and features of the present invention will become readily apparent from the following detailed description of the invention, from the claims, and from the accompanying drawings.

BRIEF DESCRIPTION OF THE DRAWINGS

In the accompanying drawings forming part of the specification, in which like numerals are employed to designate like parts throughout the same.

FIG. 4 is a bottom plan view taken generally along the plane 4—4 in FIG. 1;

FIG. 5 is a view similar to FIG. 3 but showing the closure in an assembly-ready orientation after the final manufacturing step;

FIG. 6 is a fragmentary, cross-sectional view of the closure applied to a container;

FIG. 7 is a view similar to FIG. 6 but showing the closure being removed from the container;

FIG. 8 is a view similar to FIG. 7 showing a final orientation of the tamper-evident band after removal of the closure from the container;

FIGS. 9–13 are fragmentary, simplified, cross-sectional, diagrammatic views of mold parts showing the sequence of operation according to the method of the invention for fabricating the closure;

DESCRIPTION OF THE PREFERRED EMBODIMENTS

Figure 1:
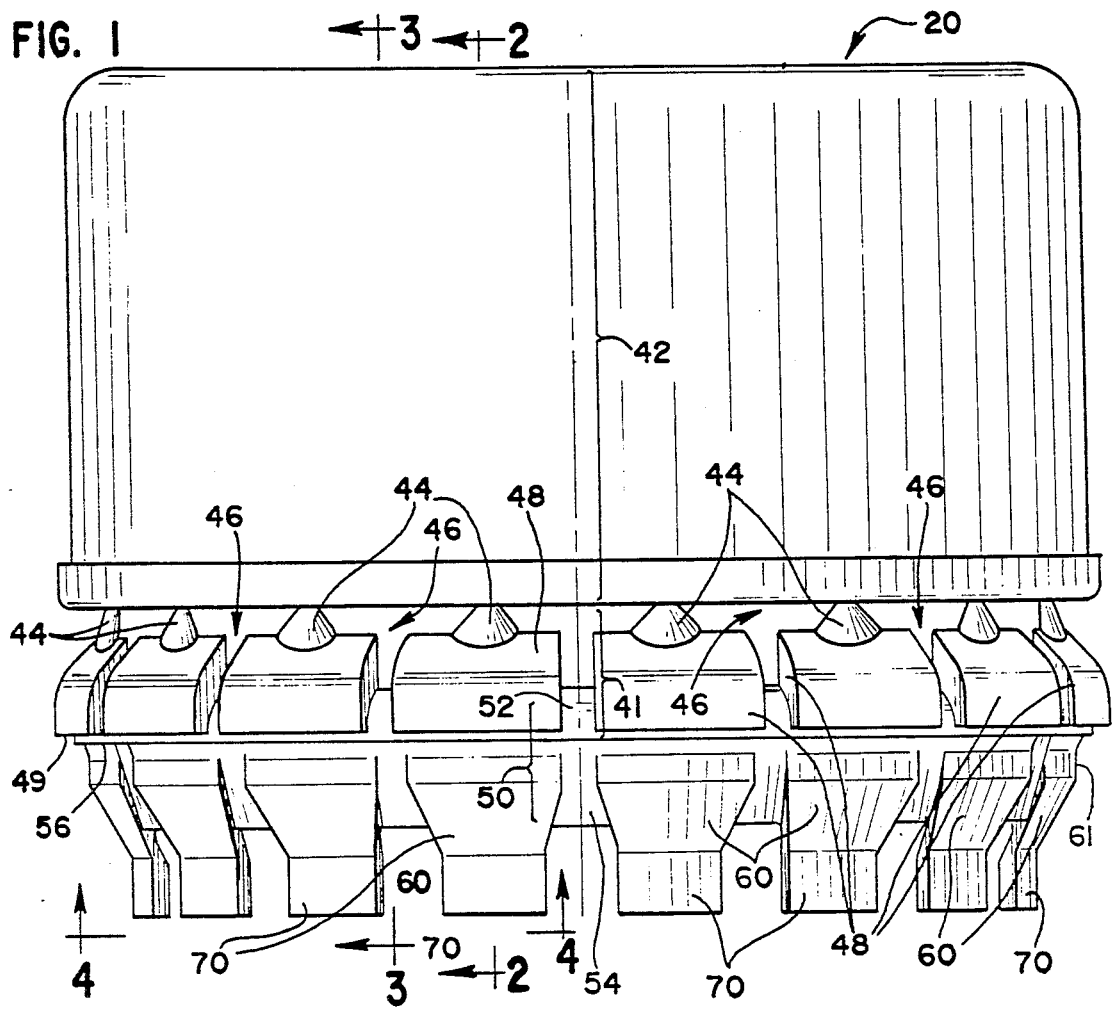
FIG. 1 is a side elevational view of a first embodiment of a closure in accordance with the teachings of the present invention, the closure being shown in an intermediate orientation during manufacture.

While this invention is susceptible of embodiment in many different forms, this specification and the accompanying drawings disclose only some specific forms as examples of the use of the invention. The invention is not intended to be limited to the embodiments so described, and the scope of the invention will be pointed out in the appended claims.

For ease of description, the article of this invention is described in the normal position in which it is encountered—upright on, or ready to be placed on, a container. Terms such as upper, lower, horizontal, etc., are used with reference to this position. It will be understood, however, that the article of this invention may be manufactured, stored, transported, used, and sold in an orientation other than the position described.

The mold parts and associated molding apparatus that may be used to effect the method of the present invention include, are used with, and are operated by, certain conventional components, the details of which, although not fully illustrated or described, will be apparent to those having skill in the art and an understanding of the necessary functions of such components.

A mounting member, in the form of a first embodiment of a closure, is illustrated in FIGS. 1-13 and is designated therein generally by the reference numeral 20. Such a closure is adapted to be mounted on a container, such as container 22 illustrated in FIG. 6. The container 22 has an exterior surface portion 24 on which the closure 20 is mounted. The exterior surface portion 24 of the container 22 is typically defined by a neck 26 on the container 22, and the neck 26 defines an opening to the container interior. The neck 26 is also typically provided with an external screw thread 28 and an annular bead 30 below the screw thread 28.

The closure 20 includes a top end wall 32 (FIG. 6) and a skirt 34 depending from the periphery of the top end wall 32. The skirt 34 has an internal screw thread 36 for engaging the container neck external screw thread 28.

In some applications, it may be desired to provide the mounting member in the form of a sleeve or ring around the container neck below the container opening, or even below a separate closure on the container. The sleeve or ring would function as a mounting member on the container for attaching auxiliary components to the container. Such auxiliary components may include tags, auxiliary caps or closures, funnels, and other devices for use with the container or container contents. Such a sleeve or ring need not have a top end wall 32 and need not be threadingly engaged with the container. However, in any event, a portion of the sleeve or ring would extend below the container annular bead 30 with which it is adapted to be engaged, at least initially, so as to resist removal or prevent removal altogether. The specific nature of the engagement between the removal-resistant sleeve and the container would be the same as that between the closure skirt 34 and container 22 which is discussed in detail hereinafter.

When the mounting member 20 is provided in the form of a closure with a tamper-evident feature, such as that illustrated in FIGS. 1-8, and when the closure is mounted on the container 22 as illustrated in FIG. 6, the closure skirt 34 extends downwardly from the periphery of the top end wall 32 to an elevation below the container annular bead 30. The skirt 34, and some other features of the closure, can be conveniently described by designating on the skirt 34 as including least a first annular section 41 and a second annular section 42 extending from and above the first annular section 41. The first annular section 41 includes the bottom portion of the skirt 34, and the second annular section 42 includes an upper portion of the skirt 34. In the preferred embodiment of the closure illustrated in FIGS. 1-8, the first annular section 41 is adapted to be separated from the second annular section 42.

In particular, the first annular section 41 is connected to the second annular section 42 with frangible means in the form of a plurality of circumferentially spaced frangible bridges 44 which are defined on the first annular section by circumferentially spaced openings 46. The exterior surface of each bridge 44 is curved and has the shape generally of one half of a frustum of a cone. The interior side of each bridge 44 is defined by a generally flat, planar surface. When oppositely directed tension forces are applied to the annular sections 41 and 42, the small, upper ends of the bridges 44 break away from the second annular section 42.

The first annular section 41 also includes a plurality of spaced-apart upper segments 48. Each upper segment 48 extends from, and downwardly below, the base of a bridge 44. Each upper segment 48 projects radially outwardly from the base of the associated bridge 44 (see FIGS. 1-3). The bottom of each upper segment 48 terminates in a downwardly facing, generally horizontal annular surface 49 (FIGS. 2 and 3).

Figure 2:
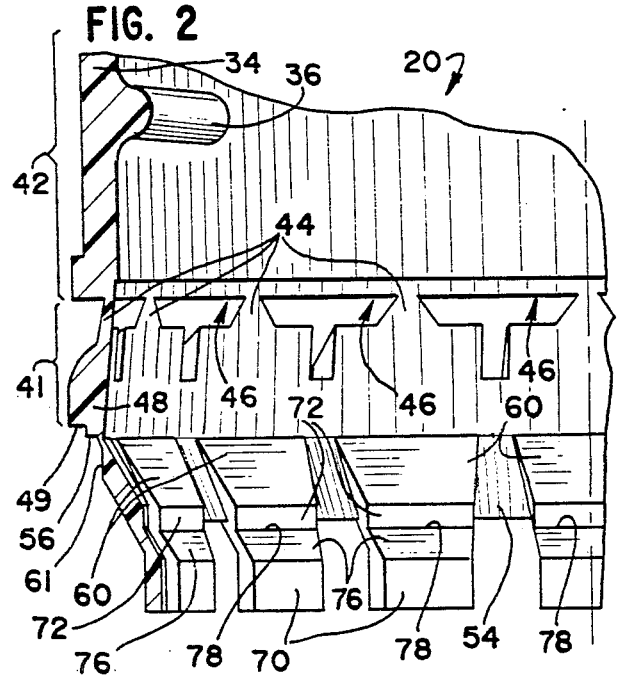
FIG. 2 is a fragmentary, cross-sectional view taken generally along the plane 2—2 in FIG. 1.
Figure 3:
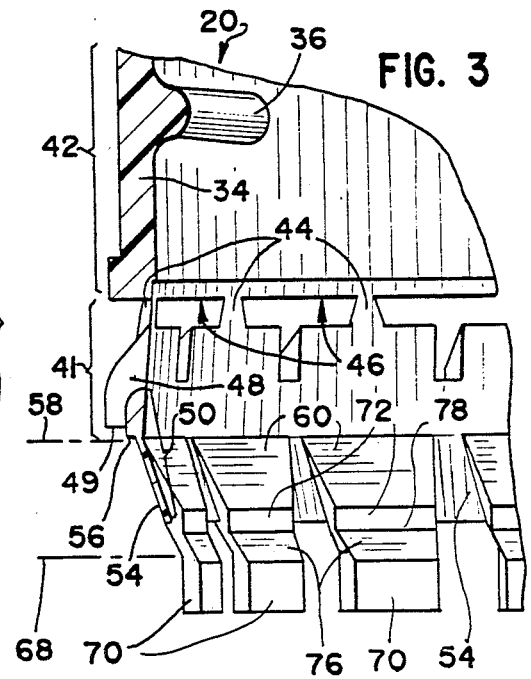
FIG. 3 is a fragmentary, cross-sectional view taken generally along the plane 3—3 in FIG. 1.

The closure 20 also includes a peripheral band and/or ring 50 which is most clearly visible in FIGS. 1 and 3. The ring 50 is formed as a unitary structure with the bottoms of the upper segments 48 and, hence, the ring 50 essentially connects the upper segments 48 in a ring-like manner.

The ring 50, as best illustrated in FIGS. 3 and 5, includes a thickened upper band portion 52 and a thin lower band portion 54. The bottom of the thickened upper band portion 52 defines a downwardly facing peripheral surface 56 which extends radially outwardly at a first bend line 58 (illustrated in FIG. 3 by the dashed line). The ring thin lower band portion 54 may be bent inwardly about the bend line 58. The radially extending surface 56 may be characterized as lying in a plane approximately at the elevation of the peripheral bend line 58. In FIG. 5, the ring thin lower band portion 54 is shown bent radially inwardly and upwardly from the peripheral surface 56 at the bottom of the thickened upper band portion 52.

In order to accommodate the inward bending of the thin lower band portion 54, the material comprising the thin lower band portion 54 is sufficiently thin in the region of the peripheral surface 56 where the thin lower band portion 54 extends from the thickened upper band portion 52.

It will be appreciated that the thin lower band portion 54 of the ring 50 extends from the bottom of the skirt 34 and, in particular, extends from the bottom of the skirt first annular section 41. That is, for purposes of the present description, the skirt 34 is defined to include the first annular section 41 down to the bend line 58.

Although the first embodiment of the closure 20 illustrated in FIGS. 1-8 is intended to function in a manner wherein the first annular section 41 of the skirt 34 is ultimately separated from the second annular section 42 of the skirt 34, it is to be realized that in other embodiments (such as the second and third embodiments illustrated in FIGS. 14 and 15, respectively) the closure skirt need not include first and second annular sections which separate from each other. In such a case, the skirt may be considered as having only one annular section which extends from the bend line at the bottom of the skirt to the top of the closure.

A plurality of circumferentially spaced arms 60 are flexibly connected to, and extend from, the first annular section 41 of the skirt 34 at the first bend line 58. This accommodates the radially inward pivoting of each arm 60 to an orientation generally alongside the skirt first annular section 41 (FIGS. 5 and 6). In the preferred first embodiment illustrated in FIGS. 1-8, the arms 60 are flexibly connected to the skirt first annular section 41 through the above-described lower band portion 54 of the ring 50.

As best illustrated in FIGS. 1-3, each arm 60 decreases in width from the first bend line 58 (FIG. 3) toward the lower arm end which defines a second bend line 68 (FIG. 3). The lower end of each arm 60 extends downwardly below the bottom peripheral margin of the thin lower band portion 54 of the ring 50.

Each arm 60 has an exterior surface terminating at the bottom end of the arm 60 along the second bend line 68. On the interior of the closure, each arm 60 has a notch-like configuration at the lower end defined by an upper surface 72 and a lower surface 76 which together define an obtuse interior angle having a vertex 78 at the juncture of the upper and lower surfaces. The lower end of each arm 60 is reduced in thickness at its lower end in the region of the surfaces 72 and 76. The upper end of each arm 60 has a reduced thickness which is defined, in part, by a generally vertical exterior surface 61 (FIGS. 1-3). Each arm 60 preferably has a trapezoidal shape in side elevational view, and a major portion of each arm 60 has a longitudinal cross section substantially in the shape of a parallelogram (as best seen in FIG. 2).

Extending from the lower end of each arm 60 is a tab 70. Preferably, each tab 70, in side elevational view, has a generally rectangular shape. Each tab 70 is sufficiently flexible and resilient at the region where it joins the arm 60 on the second bend line 68 so that it can deflect or bend. The tabs 70 may be functionally characterized as an "engaging means" for engaging the container annular bead 30.

The term "bend line" as used in this specification with reference to the bend lines 58 and 68 is not to be construed as being limited to a geometrically defined line per se. Rather, it will be appreciated that, as a practical matter, the arms 60 and tabs 70 each bend and deform in a region having some three dimensional extent or size. Each bend region can be characterized as a flexible connecting means. Further, in some contemplated alternate embodiments, there could exist some amount of bending through substantially the entire length of each arm 60 and/or tab 70 during and after application to the container neck or even prior to such application.

The structure of the closure between the first bend region or line 58 and the second bend region or line 68 may be functionally characterized as an "extension means" for extending between the two bend regions. The extension means thus includes, in the preferred embodiment, the thin peripheral band portion 54 and the unitary connected arms 60. This extension means functions to move or pivot inwardly between the molded orientation illustrated in FIGS. 1-4 and the assembly-ready orientation illustrated in FIG. 5.

The closure 20 may be molded from a synthetic plastic material as a unitary structure in an initial orientation shown in FIGS. 1-4. The molded closure can then be manipulated (e.g., as by stripping it from a mold according to the novel process of the present invention described in detail hereinafter) so as to effect an "inversion" of the arms 60 and tabs 70 to the position illustrated in FIG. 5. In the inverted position, the arms 60 have been pivoted inwardly and upwardly along with the thin band portion 54. The tabs 70 are carried with the arms 60 to the inverted position but do not otherwise occupy a "moved" orientation relative to the arms 60.

In the inverted position illustrated in FIG. 5, each tab 70 is angled upwardly and inwardly somewhat relative to the arms 60. On the other hand, when the arms 60 and tabs 70 are in the non-inverted, as-molded position, the tabs 70 are directed generally vertically downwardly while the arms 60 are angled downwardly and radially inwardly.

When the arms 60 and tabs 70 are moved to the inverted position, there is a temporary, elastic deformation of the closure in the area of the ring 50 which accommodates the inward pivoting movement. In the final, inverted position illustrated in FIG. 5, the stress in the lower band portion 54 is reduced compared to the stress in the lower band portion 54 at the intermediate positions between the as-molded, non-inverted position illustrated in FIG. 3 and the fully inverted position illustrated in FIG. 5. Thus, the band portion 54, arms 60, and tabs 70 remain in the inverted position illustrated in FIG. 5 after they have been pivoted into that orientation.

The closure 20, in the inverted orientation illustrated in FIG. 5, can be readily applied to the neck of a container 22 either manually or with automatic closure applying apparatus. To this end, with reference to FIG. 6, the closure 20 is adapted to be threadingly engaged with the container neck 26 and screwed downwardly onto the container 22. The arms 60 and tabs 70 ride over the container neck threads 28 and over the annular bead 30. The arms 60 and tabs 70 can be deflected radially outwardly as may be necessary during application of the closure to the container. Depending upon the design clearances, the skirt annular sections 41 and 42 may also temporarily deflect radially outwardly somewhat as the closure 20 is screwed onto the container 22. After the distal ends of the tabs 70 have passed over, and become positioned below, the annular bead 30, removal of the closure 20 is resisted by the tabs 70 engaging the bead 30.

If the closure is rotated in the unscrewing direction with sufficient torque, the frangible bridges 44 will ultimately break at the bottom of the skirt second annular section 42 to thereby separate the first annular section 41 from the second annular section 42.

As best illustrated in FIG. 7, as the closure 20 moves upwardly (in the direction of the arrow 83), the distal ends of the tabs 70 become more tightly engaged with the container neck 26 and with the bottom of the annular bead 28. The tabs 70 pivot radially inwardly toward the container neck 26. This exerts a radial component of force outwardly on the first annular section 41. The radially outwardly directed force, in addition to contributing to the forces breaking the bridges 44 from the closure second annular section 42, also causes the peripheral band portion 54 of the ring 50 to be somewhat stretched radially outwardly. This causes the upper segments 48 to flare outwardly as they fall away from the second annular section 42 (in the direction of arrow 85 in FIG. 8).

As illustrated in FIG. 8, the tabs 70 pivot radially inwardly against the container neck 26 and bead 28. This orientation, in conjunction with the stresses and some permanent deformation that may exist within the material, can result in the tabs 70 gripping the container neck 26 so as to hold the broken or severed portion of the closure generally in the position on the container neck 26 illustrated in FIG. 8. However, depending upon the materials employed, and depending upon the specific design clearances provided, the stresses and deformation may be considerably less so that the tabs 70 do not remain engaged tightly gripping the container neck 26 at the bead 28. Thus, with such designs, the tabs 70 will slide downwardly under the force of gravity on the container neck 26 until the severed structure rests on an enlarged shoulder area of the container 22.

In any event, the upper segments 48 tend to remain in the outwardly angled, flared orientation illustrated in FIG. 8 so as to provide a clear visual indication that the closure frangible bridges 44 have broken away from the closure second annular section 42. Thus, even when the closure 20 is screwed back onto the container neck 26, it will be clear that the first annular section 41 is no longer connected to the upper part of the closure.

It has been found that the closure 20 functions very well. It can be easily applied to a container and, when properly in position on the container neck, is effective in providing resistance to closure removal unless sufficient force is applied to sever the frangible bridges 44 from the upper portion of the closure.

Further, owing to the unique structure of the closure, the tabs 70 are sufficiently recessed and hidden under the closure to make it exceedingly difficult for the closure to be removed without severing the tamper-evident frangible bridges 44.

Further, during removal of the closure, the tabs 70 bend inwardly to tightly grip the container, and this reduces the possibility that the tabs could somehow be pried outwardly over the container bead 28 without breaking the frangible bridges 44.

Preferably, the length of each tab 70 is greater than the distance between the lower band portion 54 and the container 22 at the root of the annular bead 28. Thus, the distal end of each tab 70 interferingly engages the bead 28 so that upward displacement of the closure 20 causes the distal ends of the tabs 70 to pivot inwardly toward the container neck with a wedging action which provides an increasingly tighter engagement.

The arrangement of the tabs 70 which permit the inward pivoting about the second bend line 68 relative to the arms 60 provides a lever action to generate a relatively high moment in response to the upward movement of the closure during removal. This aids in effectively severing the frangible bridges 44.

The novel closure 20 of the present invention can be molded in a unique process that does not require side action mold parts or subsequent forming operations. Sequential steps of the unique method are illustrated in FIGS. 9–13. The mold parts are initially provided in a closed position and include a cavity mold 102 having a cavity defining the exterior surface of the closure end wall 32 and skirt 34. The cavity mold 102 thus defines at least a portion of the exterior surface of the second annular section 42 of the skirt 34.

An ejector sleeve 103 is provided adjacent the cavity mold 102 in the closed position and defines an exterior portion of the first annular section 41 of the skirt 34 below the cavity mold. The ejector sleeve 103 also defines a lower peripheral portion of the second annular section 42 of the skirt 34 as illustrated in FIG. 9.

A stationary sleeve 104 is provided to define the exterior surface of the arms 60 and tabs 70.

A generally annular core 105 is located in the closed position inwardly of the cavity mold 102, ejector sleeve 103, and stationary sleeve 104. The core 105 defines a peripheral portion of the internal surface of the closure end wall 32, and defines portions of the internal surfaces of the closure skirt 34, arms 60, and tabs 70.

A core ejector 106 is disposed within the hollow core 105. The distal end of the core ejector 106 defines a central region of the internal surface of the closure end wall 32.

The closure may be molded with the above-described mold parts by compression molding of raw stock or by injection molding according to conventional techniques, the details of which form no part of the present invention. After the closure has been molded, the closure is removed from the unique combination of mold parts by employing a unique method for opening the mold parts. Specifically, the cavity mold 102 is first moved axially in a first direction (indicated by arrow 202 in FIG. 10) away from the molded closure toward an open position spaced away from the closure. The final, open position of the cavity mold 102 is shown in FIGS. 11–13.

As the cavity mold 102 moves away from the molded closure 20, the ejector sleeve 103, core 105, and core ejector 106 move together axially in the first direction (indicated by arrows 204 in FIG. 10). These mold parts move the molded closure 20 away from the stationary sleeve 104 so that the closure arms 60 and tabs 70 are axially displaced from, and are free of, the stationary sleeve 104.

The concurrent movement of the ejector sleeve 103, core 105, and core ejector 106 may occur after the cavity mold 102 has been moved to the full open position (shown in FIGS. 11-13). However, in a preferred form of the method, a more efficient procedure is to move the ejector sleeve 103, core 105 and core ejector 106 together and concurrently with the cavity mold 102. The cavity mold 102 can be separated from the molded closure 20 by moving the cavity mold 102 at a greater speed than the ejector sleeve 103, core 105, and core ejector 106. Alternatively, the cavity mold 102 can be moved at the same rate of speed as the ejector sleeve 103, core 105, and core ejector 106, and then movement of the cavity mold 102 can be continued further after the ejector sleeve 103, core 105, and core ejector 106 have stopped moving.

As illustrated in FIG. 11, the ejector sleeve 103 and core ejector 106 are moved axially further in the first direction (designated by arrows 206 and 207, respectively, in FIG. 11) relative to the core 105 so as to strip the closure 20 past the core 105. Preferably, the movement of the core 105 is terminated at the elevation illustrated in FIGS. 10-13 while at least the ejector sleeve 103 and core ejector 106 continue moving axially further to the position illustrated in FIG. 11.

When the mold parts have reached the relative positions illustrated in FIG. 11, the ends of the tabs 70 have been moved beyond the end of the core 105. In order to reach this position, the ejector sleeve 103 has moved axially much further than the core ejector 106. This moves the closure top end wall 32 off of the distal end of the core ejector 106. Further, as the ejector sleeve 103 moves axially in the direction of arrow 206 as illustrated in FIG. 11, the closure skirt 34, arms 60, and tabs 70 are forced upwardly out of engagement with the core 105.

As illustrated in FIG. 10, the arms 60 and tabs 70 are initially disposed radially inwardly in an undercut region of the core 105. As the closure is moved upwardly off of the core 105 by the ejector sleeve 103, the closure 20 undergoes a temporary, elastic deformation in the nature of a circumferential expansion to permit the closure to become disengaged from the core 105. However, as the closure 20 clears the top of the core 105, the resilient nature of the material causes the closure to assume its original, molded shape wherein the arms 60 and tabs 70 become positioned radially inwardly of the outer circumference of the top of the core 105. This causes the distal ends of the tabs 70 to be positioned above, and generally vertically aligned with, an annular top surface region of the core 105 when the closure 20 is in the position illustrated in FIG. 11.

It will be appreciated that the peripheral surface of the elevated core ejector 106, in conjunction with the annular distal end surface of the core 105, defines a shoulder. These surfaces of the core 105 and core ejector 106 function as a "repositioning mold means" for repositioning the molded arms 60 and tabs 70 as will next be explained.

The ejector sleeve 103 is then returned back toward the initial mold closed position by moving the ejector sleeve 103 axially in a second direction (designated generally by arrow 208 in FIG. 12). As the ejector sleeve 103 returns toward the mold closed position, it carries the molded closure 20 downwardly toward the core 105 and elevated core ejector 106. The distal ends of the tabs 70 engage the core 105 as the closure 20 continues being carried downwardly by the ejector sleeve 103. The tabs 70 are received and restrained in the shoulder defined by the core 105 and core ejector 106. Downward movement of the closure 20 causes the upper ends of the arms 60 to move downwardly. This pivots the arms 60 downwardly about the second bend line 68 where the tabs 70 are connected to the arms 60.

As the arms 60 are pivoted further downwardly, they engage the top surface of the core 105. This prevents further movement of the closure 20 in the direction of arrow 208. However, the ejector sleeve 103 continues moving toward the closed position in a direction of arrow 208 so that it separates from the closure 20.

With reference to FIG. 12, it will be appreciated that it is the relative positions and movements of the mold parts 103, 105, and 106 which are important at that point in the process. The core 105 and core ejector 106 are maintained in the relatively axially offset orientation to define the shoulder for trapping the tabs 70 and arms 60 while the ejector sleeve 103 moves relative to the core 105 and core ejector 106. This relationship can be maintained, and the process more efficiently operated, if the core 105 and core ejector 106 begin to move together back toward the mold closed position (in the direction of arrows 210 in FIG. 13) while the ejector sleeve 103 is returning to the mold closed position at a greater speed so as to separate from the closure 20.

After the arms 60 and tabs 70 have been pivoted to the position illustrated in FIG. 12, the differential axial displacement between the core 105 and core ejector 106 is no longer required, and the core ejector 106 can be moved axially downwardly (in the direction of arrow 210 in FIG. 13) relative to the core 105 so that the distal top end of the core ejector 106 is again flush with the annular distal end surface of the core 105 as illustrated in FIG. 13. This permits the tabs 70 to spring inwardly and upwardly owing to the resilience of the plastic material. The arms 60 and tabs 70 thus assume the "inverted" orientation shown in FIG. 13, and this is the assembly-ready orientation of the closure previously described in detail with reference to FIGS. 5 and 6.

When the ejector sleeve 103 has become disengaged from the exterior of the closure 20 and when the core ejector 106 has become disengaged from the tab 70 on the interior of the closure 20, the closure 20 is no longer restrained by the mold parts and is free to drop away (as illustrated in FIG. 13) or to otherwise be removed.

The above-described novel method for operating the unique mold parts thus produces and releases a molded closure or other mounting member without the use of side action mold parts. Further, the method produces an assembly-ready mounting member without requiring further forming operations, fabrication, or secondary manufacturing steps.

Figure 14:
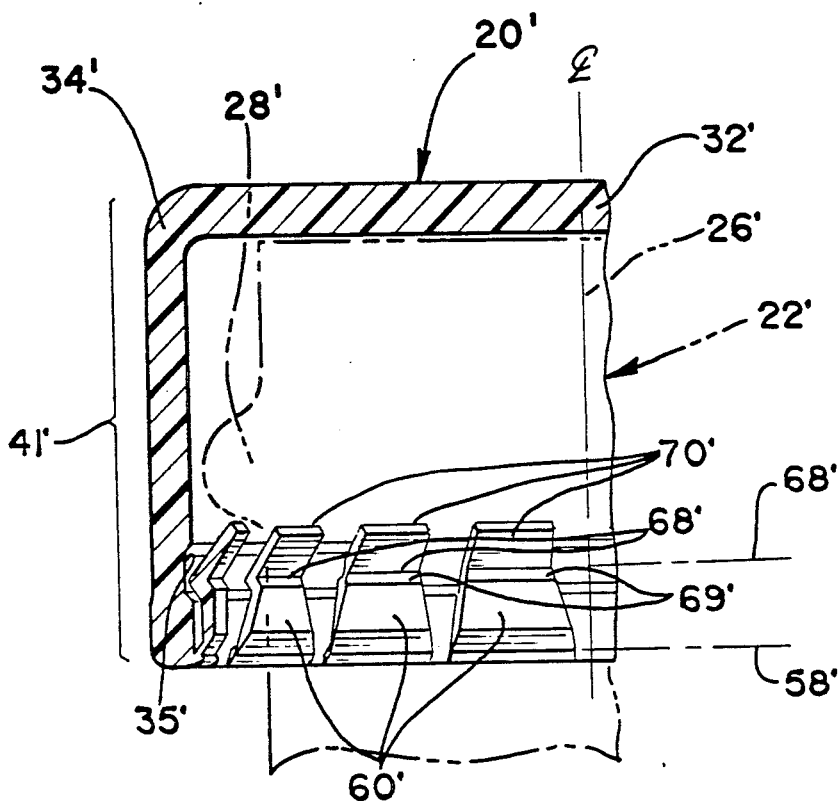
FIG. 14 is a fragmentary, cross-sectional view of a second embodiment of a closure of the present invention.

FIG. 14 illustrates a second embodiment of the mounting member of the present invention in the form of a closure 20' having a top end wall 32' and a skirt 34'. This closure 20' does not incorporate a tamper-evident feature and does not employ frangible bridges or other severable structures.

The closure 20' is adapted to be mounted on the neck 26' of a container 22'. The neck 26' includes an annular bead 28'. The closure skirt 34' includes at least a first annular section 41'. In this embodiment, the first annular section 41' corresponds essentially to the entire skirt 34'. Since there is no frangible structure employed in this closure 20', the skirt 20' does not have severable first and second annular sections as were provided in the first embodiment of the closure 20 discussed above with reference to FIGS. 1-8.

The closure 20' includes a plurality of circumferentially spaced arms 60' connected to, and extending from, the skirt 34' at a first bend line 58' to accommodate radially inward pivoting of each arm 60' to an orientation generally alongside the skirt 34' as illustrated in FIG. 14.

A plurality of circumferentially spaced tabs 70' are each flexibly connected to, and extend radially inwardly of, one of the arms 60' at a second bend line 68' to accommodate radially inward pivoting of each tab 70' toward the container 22' when sufficient relative radial displacement is effected between the closure 20' and the container 22' to engage the container annular bead 28' with the distal ends of the tabs 70' and thereby resist further axial displacement.

Since no frangible structure is provided in this second embodiment of the closure 20', the closure cannot be removed. However, the closure 20' may be provided with a suitable special or conventional dispensing lid or nozzle (not illustrated) in the top end wall 32'.

The closure can be easily assembled onto the container 22' owing to the configuration of the arms 60' and tabs 70'. The arms 60' and tabs 70' are generally similar to the arms 60 and tabs 70, respectively, discussed above with reference to the first embodiment of the closure 20 illustrated in FIGS. 1-8. However, in the second embodiment of the closure 20', the arms 60' are provided with an additional angled surface 69' adjacent the second bend line 68'. As in the first embodiment, the first bend line 58' is defined generally at the end of the tabs 60' where they are connected in a unitary manner with the first annular section 41' of the closure 20'.

The second embodiment of the closure 20' includes a further feature that accommodates application of the closure 20' to the container. Specifically, the inside of the skirt 34' defines an annular channel 35' to accommodate an exterior portion of each tab 70' and to facilitate outward deflection of the tabs 70' as they are cammed radially outwardly over the container annular bead 28' during assembly of the closure 20' onto the container 22'.

Additionally, the circumferential wall of channel 35' functions to support the tabs 60' and 70' during removal, and thus channel 35' assists in performing the intended function of the tabs 60' and 70' during removal.

If desired, the structure illustrated in FIG. 14 can be provided as a mounting member without a top end wall 32'. As such, it would function as a mounting ring or sleeve around the neck of a container which could not be removed once it was applied to the container neck. Such a sleeve could be used a means for attaching to the container various auxiliary components, including labels, closures, auxiliary closures, or other articles for use with the container or container contents.

Figure 15:
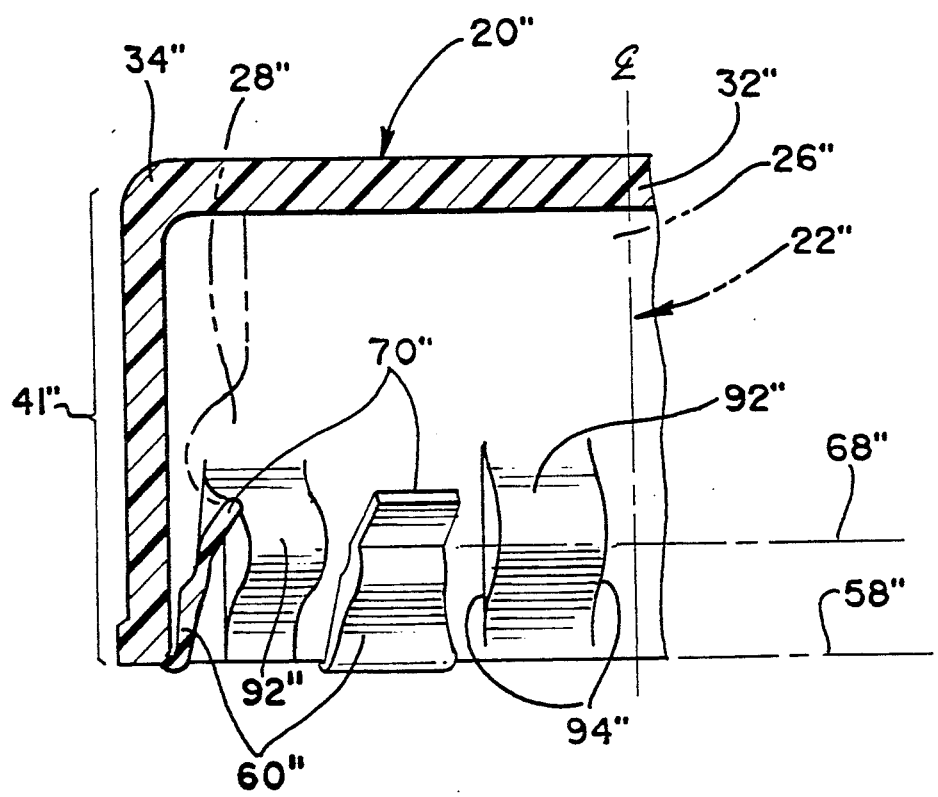
FIG. 15 is a fragmentary, cross-sectional view of a third embodiment of a closure of the present invention.

A third embodiment of the mounting member of the present invention is illustrated in FIG. 15 wherein it is shown as a closure 20" on a container 22". The closure 20" is mounted on the neck 26" of the container, and the neck 26" has an annular bead 28" for retaining the closure 20" on the container 22" and preventing removal of the closure from the container.

The closure 20" includes a top end wall 32" and a skirt 34" The skirt 34" functions essentially as a first annular section 41". At the end of the first annular section 41", a plurality of circumferentially spaced arms 60" are connected in a unitary manner to the closure 20" about a first bend line 58".

A plurality of circumferentially spaced tabs 70" are each flexibly connected to, and extend radially inwardly of, one of the arms 60" at a second bend line 68" to accommodate radially inward pivoting of each tab 70" toward the container 22".

As with the second embodiment of the closure 20' described above with reference to FIG. 14, the third embodiment of the closure 20" does not have a tamper-evident feature and does not employ any frangible structure.

The third embodiment of the closure 20" includes an additional, unique feature which makes it even more difficult to remove the installed closure 20" without destroying the closure. Specifically, the closure skirt 34" includes a plurality of inwardly projecting, circumferentially spaced-apart lugs 92" which also interferingly engage with the annular bead 28" of the container 22". Each lug 92" is convex inwardly when viewed from the interior of the closure 20". Each lug 92" is molded as a solid part of the closure side wall first annular section 41" and is defined on each side by a groove 94" in the skirt 34". Each groove 94" is a weakened or thinned channel which extends from the top of a lug 92" to the bottom edge of the side wall first annular section 41". The grooves 94" may be disposed anywhere along the circumferential portions of the section 41" defined between the side edges of the lugs 92" and the planes defined by the intersection of the tabs 60" and 70" with the annular section 41".

The lugs 92" are resilient and can be deformed outwardly. This enables the closure 20" to be mounted onto the container neck 26' since the lugs 92" will be deflected outwardly temporarily by the container annular bead 28" as the lugs 92" pass over the bead 28".

It will readily observed from the foregoing detailed description of the invention and from the illustrated embodiments thereof that numerous variations and modifications may be effected without departing from the true spirit and scope of the novel concepts or principles of this invention.

What is claimed is:

1. A mounting member for being mounted to a container that has an exterior surface portion and an annular bead projecting from the circumference of said surface portion, said mounting member comprising:

a skirt for being disposed around said container exterior surface portion with at least a first annular section of the skirt extending axially on one side of said container annular bead, said first annular section of said skirt defining a plurality of circumferentially spaced-apart inwardly convex lugs for engaging said annular bead of said container;

extension means for extending from the peripheral edge of said first annular section;

first flexible connecting means for connecting said extension means to said skirt first annular section at a first bend region to accommodate radially inward movement of said extension means to an orientation generally alongside said skirt first annular section;

a plurality of circumferentially spaced tabs each extending from and radially inwardly of said extension means; and second flexible connecting means for connecting each said tab to said extension means at a second bend region to accommodate radially inward pivoting of each said tab toward said container when sufficient relative axial displacement is effected between said mounting member and container to engage said container annular bead with the distal end of said tab and thereby resist further axial displacement.

* * * * *

UNITED STATES PATENT AND TRADEMARK OFFICE
CERTIFICATE OF CORRECTION

PATENT NO. : 5,007,545

DATED : April 16, 1991

INVENTOR(S) : Leo R. Imbery, Jr.

It is certified that error appears in the above-identified patent and that said Letters Patent is hereby corrected as shown below:

Column 14, line 50, "said first" should be

--said skirt first--.

Signed and Sealed this

Thirteenth Day of October, 1992

Attest:

DOUGLAS B. COMER

*Attesting Officer*      *Acting Commissioner of Patents and Trademarks*